United States Patent [19]

Keating, III et al.

[11] Patent Number: 5,220,874

[45] Date of Patent: * Jun. 22, 1993

[54] METHOD AND APPARATUS FOR STRIPPING VOLATILE ORGANIC COMPOUNDS FROM SOLID MATERIALS

[75] Inventors: Paul J. Keating, III, Leominster, Mass.; Alvah V. Barron, Birmingham, Ala.; J. D. Derman, Loudonville; William D. Bradley, Troy, both of N.Y.

[73] Assignee: Keating Environmental Service, Inc., Lunenberg, Mass.

[*] Notice: The portion of the term of this patent subsequent to Mar. 28, 2006 has been disclaimed.

[21] Appl. No.: 576,413

[22] PCT Filed: Mar. 15, 1989

[86] PCT No.: PCT/US89/01029

§ 371 Date: Sep. 24, 1990

§ 102(e) Date: Sep. 24, 1990

Related U.S. Application Data

[63] Continuation-in-part of Ser. No. 171,685, Mar. 22, 1988, Pat. No. 4,815,398.

[51] Int. Cl.[5] .................... F23G 5/02; F23G 7/14; F27B 7/36; F27B 7/02

[52] U.S. Cl. .................... 110/246; 110/346; 432/105; 432/106

[58] Field of Search ............... 110/210, 219, 224, 226, 110/229, 236, 246, 346; 432/105, 106, 111

[56] References Cited

U.S. PATENT DOCUMENTS

| | | |
|---|---|---|
| 3,763,572 | 10/1973 | Titus . |
| 4,374,650 | 2/1983 | Garside . |
| 4,374,704 | 2/1983 | Young . |
| 4,431,405 | 2/1984 | Eatherton . |
| 4,473,461 | 9/1984 | Thacker et al. . |
| 4,531,462 | 6/1985 | Payne .................... 110/210 |
| 4,541,346 | 9/1985 | Culliford .................... 432/105 X |
| 4,563,246 | 1/1986 | Reed et al. . |
| 4,572,781 | 2/1986 | Krasuk et al. . |
| 4,640,681 | 2/1987 | Steinbiss et al. .................... 432/14 |
| 4,700,638 | 10/1987 | Przewalski .................... 110/236 X |
| 4,738,206 | 4/1988 | Noland .................... 110/346 |
| 4,748,921 | 6/1988 | Mendenhall .................... 110/346 |
| 4,751,887 | 6/1988 | Terry et al. .................... 110/246 |
| 4,787,323 | 11/1989 | Beer et al. .................... 110/346 |
| 4,794,871 | 1/1989 | Schmidt et al. .................... 110/210 X |
| 4,827,854 | 5/1989 | Collette .................... 110/226 X |
| 4,881,473 | 11/1989 | Skinner .................... 110/224 X |
| 4,890,563 | 1/1990 | White et al. .................... 110/246 |

FOREIGN PATENT DOCUMENTS 2141812 1/1985 United Kingdom .

OTHER PUBLICATIONS

Hazardous Waste Consultant, 1988, pp. 1-6 to 1-20.

*Primary Examiner*—Henry A. Bennet
*Assistant Examiner*—C. Kilner
*Attorney, Agent, or Firm*—Fish & Richardson

[57] ABSTRACT

Apparatus, and a method for using the apparatus, for stripping solid material containing at least one volatile organic compound (VOC). The apparatus is provided with a dryer having a heat source to heat the VOC-containing material to a first temperature, hot enough to volatilize the VOC, but below the cracking temperature of the VOC. The VOC in the dryer is volatilized to form VOC gases. A means for combusting the VOC gases (e.g. a kiln) heats the VOC gases with excess air to a second temperature, hot enough to destroy the organics in the VOC gases. Simultaneously the combustion means preferably can be used to treat a kiln processable material to form a desired product. The kiln includes means for feeding the kiln processable material to the heating chamber, means for cooling and recovering the desired product, and means for providing heat for the VOC dryer. The apparatus also includes a conduit for conducting the gases containing VOC from the dryer to the kiln.

30 Claims, 3 Drawing Sheets

METHOD AND APPARATUS FOR STRIPPING VOLATILE ORGANIC COMPOUNDS FROM SOLID MATERIALS

This is a continuation-in-part of application Ser. No. 171,685, filed Mar. 22, 1988, now U.S. Pat. No. 4,815,398.

BACKGROUND OF THE INVENTION

This invention relates to apparatus and methods suitable for stripping volatile organic compounds (VOC's) from solid materials, e.g. detoxifying soils contaminated with volatile hydrocarbons or other volatile organic compounds.

Soils become contaminated by hydrocarbons and other organic compounds in many ways, including leakage from underground storage tanks or spillage during trucking and shipping. Contaminated soils should be treated, e.g., to prevent contamination of water supplies or nearby plants and animals, including humans. One treatment involves extremely high temperatures (2000° F.) and requires substantial energy consumption to volatilize and breakdown the organic compounds to form relatively non-toxic gases. Alternatively, volatilized organic compounds are adsorped to solid material. In the former case, the volatile organic compounds are destroyed by prolonged heating at extremely high-temperatures so as to completely oxidize them to $CO_2$, $H_2O$ and other relatively non-toxic substances. In the latter case, the solid material must be disposed of.

For example, Hazardous Waste Consultant (1988, p. 1-16 to 1-20) describes new technology for removing volatile organic compounds ("VOCs") from soils. One process involves shredding and aerating the contaminated soil. The other involves use of a heat exchanger to dry and heat the soil to about 450° F. "At this temperature, the VOCs (volatile organic compounds) are vaporized and can either be destroyed through subsequent high-temperature incineration or recovered via condensation and adsorption on activated carbon." In the described system, the soil is heated by two "hot screws" which have hot oil circulating through them. Energy to heat the soil is provided by a 6-million-BTU/hour hot oil heater. "Combustion of propane and VOCs from the system heat the circulating oil to 640° F." VOCs from the treated soil are passed through a baghouse filter, a condenser and then an after burner (fired by propane) for thermal treatment. Condensates from this treatment are either removed directly as oils, or adsorbed to carbon. See, e.g. U.S. Pat. No. 4,738,206.

Eatherton (U.S. Pat. No. 4,431,405) describes use of a rotary dryer for depositing hydrocarbon contaminants onto wood. The dryer is heated with hot air of 1,100° F.

The energy demand imposed for destroying volatile organic compounds is a significant drawback to processes with that requirement.

SUMMARY OF THE INVENTION

We have found that it is possible to combine a relatively low temperature dryer for volatilization of VOC's with a high-temperature combustion chamber, such as a kiln for processing a second material, in a way that provides a highly favorable balance of energy inputs and product/waste output. In this way, the efficiency of the overall system is enhanced, in terms of economic/energy cost, and in terms of control of the nature and quality of the output. The combination further provides flexibility of operation for adjusting the combustion chamber and dryer operation to suit particular VOC input and processing demands.

In general, the invention features apparatus, and a method using the apparatus, for stripping VOC-containing material. The apparatus is provided with a dryer having a heat source capable of heating the VOC-containing material to a temperature that is hot enough to volatilize the VOC, but is below the cracking temperature of the VOC. The VOC in the dryer is volatilized to form VOC gases, which are fed through a conduit to a means for combusting VOC gases in a heating chamber by means of heat source capable of heating the VOC gases to a second temperature, hot enough to breakdown the hydrocarbons into non-toxic products. By "non-toxic", we mean products which can be released to the atmosphere (e.g., $H_2O$ and $CO_2$) or can be readily treated to form non-toxic solid or liquid waste (e.g., HCl which can be lime-treated). Preferably, the heating chamber and conduit are designed to substantially avoid releasing the VOC gases to the surrounding environment.

The preferred apparatus has the following features. Preferably the means for combusting the VOC gases is a kiln, which includes a heating chamber for breaking down the VOC gases as described above while simultaneously treating kiln processable material to form a desired product at the second temperature. Means for feeding the kiln processable material to the heating chamber, and means for recovering the desired product are also included in the apparatus. Alternatively, the means for combusting VOC gases is a power or heat source, powered (fueled) at least in part by the VOC gases. The kiln heat source directly heats the kiln processable material to form the desired product. By direct heating, we mean the application of heat to the interior of the kiln heating chamber. After processing in the kiln, the desired product is cooled in a kiln product cooler. The apparatus can include a second conduit for conducting heated air from the means for VOC gas combustion (e.g. from the kiln product cooler) to the dryer. The dryer is adapted to use this heated air at least in part to heat the VOC-contaminated material. The dryer can contain an auxiliary heat source in addition to the above-mentioned heated air. The dryer and conduit are maintained at negative pressure with respect to the surrounding atmosphere (ambient pressure), so VOC gases generated in the dryer are prevented from flowing into the surrounding atmosphere.

The VOC-containing material is preferably soil or other solids contaminated with petroleum or natural gas-based hydrocarbons (e.g., spilled virgin heating oil), or with halogenated, nitrated, or sulfonated hydrocarbons. The material can also be solid refuse which contains strippable VOC, such as tires or other disposed solid material. The particulate material processed in the kiln may be shale, clay, limestone, calcite, phosphate rock, or aluminum oxide. The first temperature is preferably between about 300° F. and 500° F. (most preferably between 350° F. and 400°–450° F.), and the second temperature is at least about 1800° F. (most preferably above 2000° F.). The dryer is a rotary dryer and the kiln is a rotary kiln. The gases produced from the VOC materials are held at the second temperature for at least about 2 seconds. Preferably, the heated air from the means for combusting VOC gases is used to heat the rotary dryer by flowing the heated air counter to, or in the same direction as, the flow of VOC-containing material in the dryer.

The invention also features a method for stripping VOC from solid material by heating the material in a dryer to a first temperature hot enough to volatilize the VOC and below the cracking temperature of the VOC, to produce VOC gases; channeling the VOC gases in a conduit from the dryer to a means for combusting the VOC gases which includes a heating chamber; and heating the gases in the heating chamber at a second temperature, hot enough to produce non-toxic products from the VOC gases.

In preferred embodiments, the means for combusting VOC gases is a kiln with a heating chamber for combusting the VOC gases and simultaneously heating a kiln processable material to form a desired product. Alternatively, the means for combusting VOC gases is a power or heat source. Preferably, the method further comprises heating the dryer by channeling hot air from the means for combusting VOC gases (e.g. from the kiln product cooler to the dryer) in a direction counter to, or in the same direction as, the direction of the flow of VOC-containing material within the dryer.

Other preferred features of the method are specified above in the description of the preferred apparatus.

This invention provides an efficient and cost-effective way to detoxify contaminated soils, using readily available apparatus, with efficient use of fuel. The process is used not only to detoxify the contaminated material but simultaneously to produce a desired product from a kiln processable material such as solid particulate matter. VOC gases flowing from the dryer are maintained within a negative pressure system, to avoid escape to the environment during this process. Thus, this invention provides safe and efficient means for detoxifying VOC-containing materials.

Other features and advantages of the invention will be apparent from the following description of the preferred embodiments thereof, and from the claims.

DESCRIPTION OF PREFERRED EMBODIMENTS

The drawings will first briefly be described.

Drawings

STRUCTURE

Figure 1:
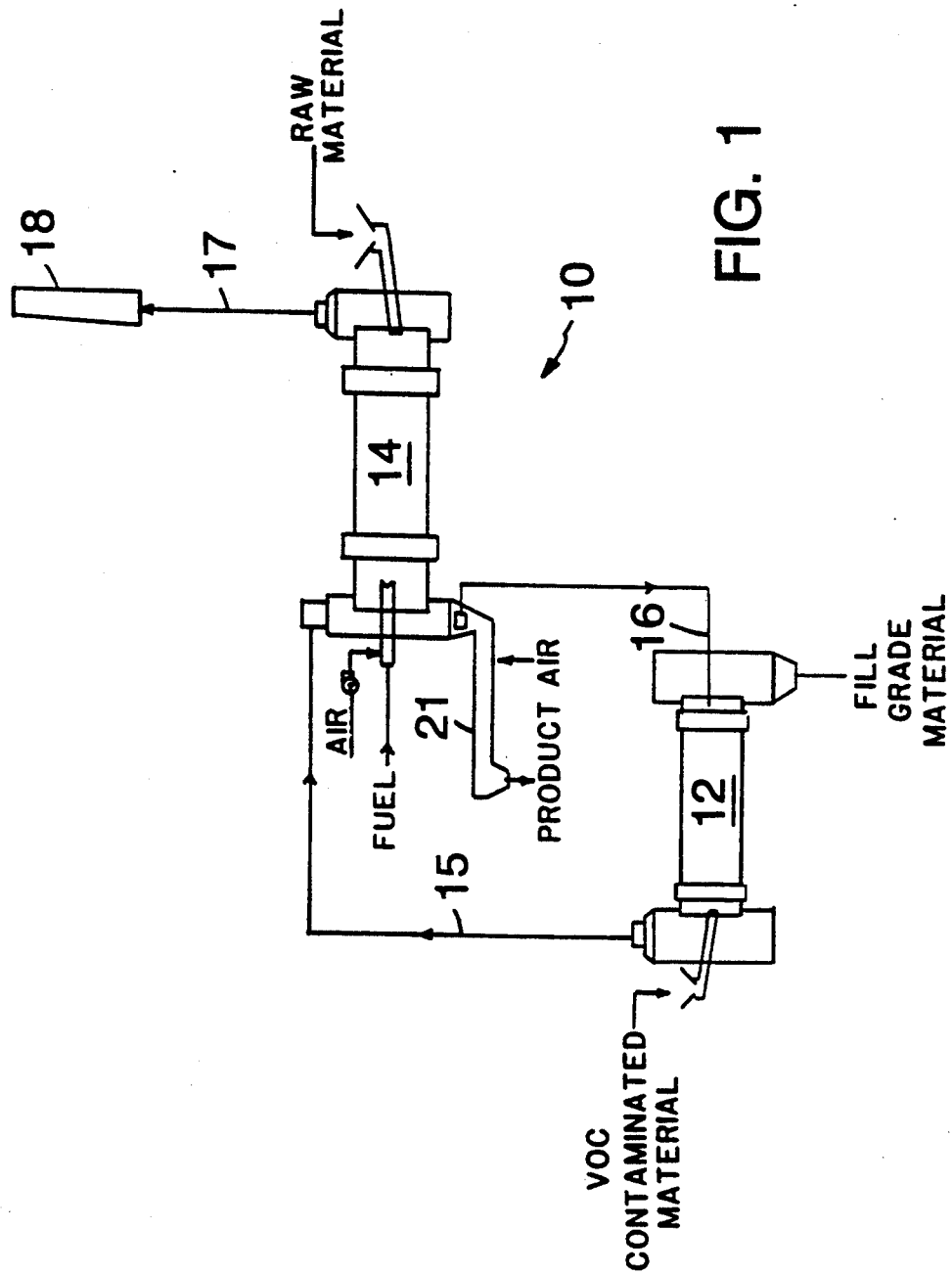
FIG. 1 is a schematic representation of apparatus generally suitable in the invention.

Referring to FIG. 1, a generalized apparatus 10, suitable for detoxifying contaminated material such as soil contaminated with oil, is provided with a rotary dryer 12 and a rotary kiln 14. VOC-contaminated material is fed into dryer 12 where it is heated to volatilize organic material without cracking to form carbonaceous deposits. Hot air 16 for this heating is obtained from kiln product cooler 21. VOC gas generated by volatilizing the VOC-contaminated material is fed to kiln 14 via conduit 15. The resulting organic-rich gas is fed into kiln 14, where it is mixed with excess air, e.g. about 10–100% over stochiometric amounts of oxygen, depending on the kiln process at issue. This excess air is used to provide additional combustion air as required to fire the kiln and to drive the reaction of VOC gas in the desired direction. Fuel is also mixed with the VOC as and the mixture is burned together to provide the heat source for the kiln-processable material. The temperature achieved is hot enough to break down the organic compounds to non-toxic gases 17, such as carbon dioxide, water, and other gases, which are eventually vented at stack 18.

Advantageously, the kiln simultaneously serves to convert raw material to a desired product economically. For example, certain shales and clays may be converted to a useful building material component, known as light weight aggregate, by processes known to those in the field.

For example, in one known technique, Normanskill shale, a uniform, dark grey to black, fine-grained shale is crushed ($\frac{1}{4}$"–2") and expanded in a rotary kiln where temperatures in the burning zone are maintained from 2000°–2100° F. At this temperature the shale reaches what is known as the point of incipient fusion where the shale is in a semiplastic state. Entrapped gases are formed and expansion results creating individual non-connecting air cells. The expanded shale is discharged from the kiln onto an air quenched grate cooler. The vitreous clinker formed on cooling is conveyed on a belt for stockpile storage. The clinker is conveyed to a crusher and finish mill. The crushed and ground material is again moved by covered conveyors to properly sized screens atop totally enclosed storage silos, and there sized to the desired gradations. This process is generally described in Stanton U.S. Pat. No. 2,035,845.

The pressure within dryer 12, and conduits 15 and 16, are maintained at a negative level relative to the surrounding environment, to prevent exit of organic gases.

Figure 2:
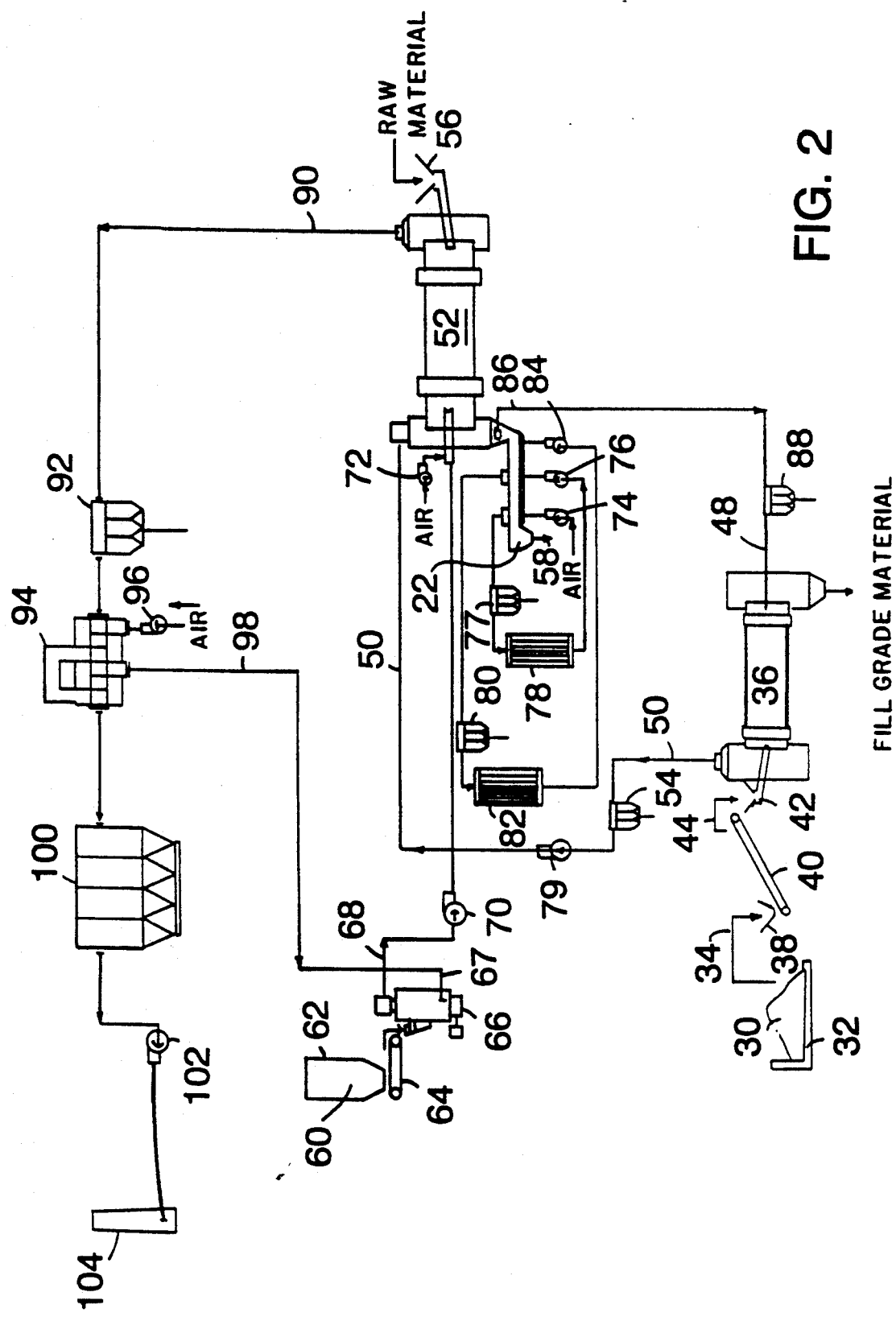
FIG. 2 is a more detailed schematic representation of the apparatus of FIG. 1.

Those skilled in the art will recognize that the general scheme described above, and shown in FIG. 1, can be supplemented to include a variety of other features, e.g., as shown in FIG. 2. This example is not limiting to the invention but meant as a guide to show a specific efficient detoxification system.

Example of Method of Use

FIG. 2 depicts apparatus suitable for conversion of shale to a building material component, and for simultaneous detoxification of waste soil to fill material.

Soil 30 containing volatile organic materials, particularly hydrocarbons such as oil from an oil spill, is held within a storage pad 32 until it can be transferred, as shown by arrow 34, to fill dryer 36 via a fill bucket 38 on conveyor 40. Soil 30 is transferred from conveyor 40 to entrance 42 of dryer 36 as shown by arrow 44. Fill dryer 36 is a standard dryer, for example as manufactured by Littleford, Inc. of Ohio, formed of steel. Dryer 36 is heated by hot air passing along conduit 48 such that the gases flow counter to the flow of soil 30 entering dryer 36. Dryer 36 allows heating of soil 30 to a temperature between about 350° and 450° F. This temperature is designed such that VOC materials within waste 30 are volatilized without cracking. After this treatment, the hot gases containing volatilized hydrocarbons are passed along conduit 50, by means of fan 79, and fed into rotary kiln 52, after dust has been removed using dust collector 54. This gas is used as combustion air for kiln 52.

Rotary kiln 52 is a standard kiln, for example, as manufactured by Fuller Co., Bethlehem, Pa. It is formed of welded steel and is refractory lined. Raw material, such as shale, is fed into inlet spout 56 of rotary kiln 52 and heated to approximately 2000° F. while it passes through the kiln. After passage the raw material is converted to a desired product, in this case, the shale will expand to form light weight aggregate 58 which is suitable as a building material component. Rotary kiln 52 is heated by coal 60 held in coal shuttle 62. The coal is weighed on conveyor 64 as it passes to roll mill 66 where it is crushed and dried by hot air from conduit 67 and transported via conduit 68 to rotary kiln 52, with the help of coal fan 70, where it serves as fuel for rotary kiln 52. Air is supplied at the entrance point of this fuel to kiln 52 via conduit 72. The fuel/air mixture in turn is mixed with exhaust gases from fill dryer 36 which pass along conduit 50 to rotary kiln 52.

Kiln product grate cooler 22 is provided with a series of heat exchangers in which air is blown by fan 74 through the grate cooler 22 to multi-cyclone 77 (for dust removal), to heat exchanger 78; it is then again blown by another fan 76 through the grate cooler 22, dust is again removed in dust collector 80, the air passed through a second heat exchanger 82, and blown by yet another fan 84 back to the grate cooler for product cooling and for part of the secondary combustion air requirement. Hot air from the grate cooler is regulated, so that a portion is used for product cooling, a portion is used for part of the secondary combustion air requirement of kiln 52, and a portion is removed via conduit 86 for heating fill dryer 36. Dust in the air stream of conduit 86 is removed via mutli-cyclone 88. The air then pass via conduit 48 to fill dryer 36.

Gases exit rotary kiln 52 via conduit 90 to a series of treatment devices including a multi-cyclone dust collector 92, a heat exchanger 94. Air is heated in exchanger 94, to produce hot air which is used to heat roll mill 66 via conduits 98 and 67. Cooled gases from exchanger 94 are lime-treated by standard techniques prior to entering bag house 100. An induced draft fan 102 pulls exhaust gases through the system. Cleansed exhaust gases are passed to the atmosphere via exhaust stack 104.

The above apparatus shows the use in combination of a rotary dryer and a rotary kiln. This allows simultaneous conversion of raw material into a useful desired product, and of waste material containing hydrocarbons into useful fill material. The system also includes means for efficiently using hot air produced in the product cooler to heat the rotary dryer. The hot gas stream from the rotary dryer is used to provide secondary combustion in the kiln.

Other Embodiments

Figure 3:
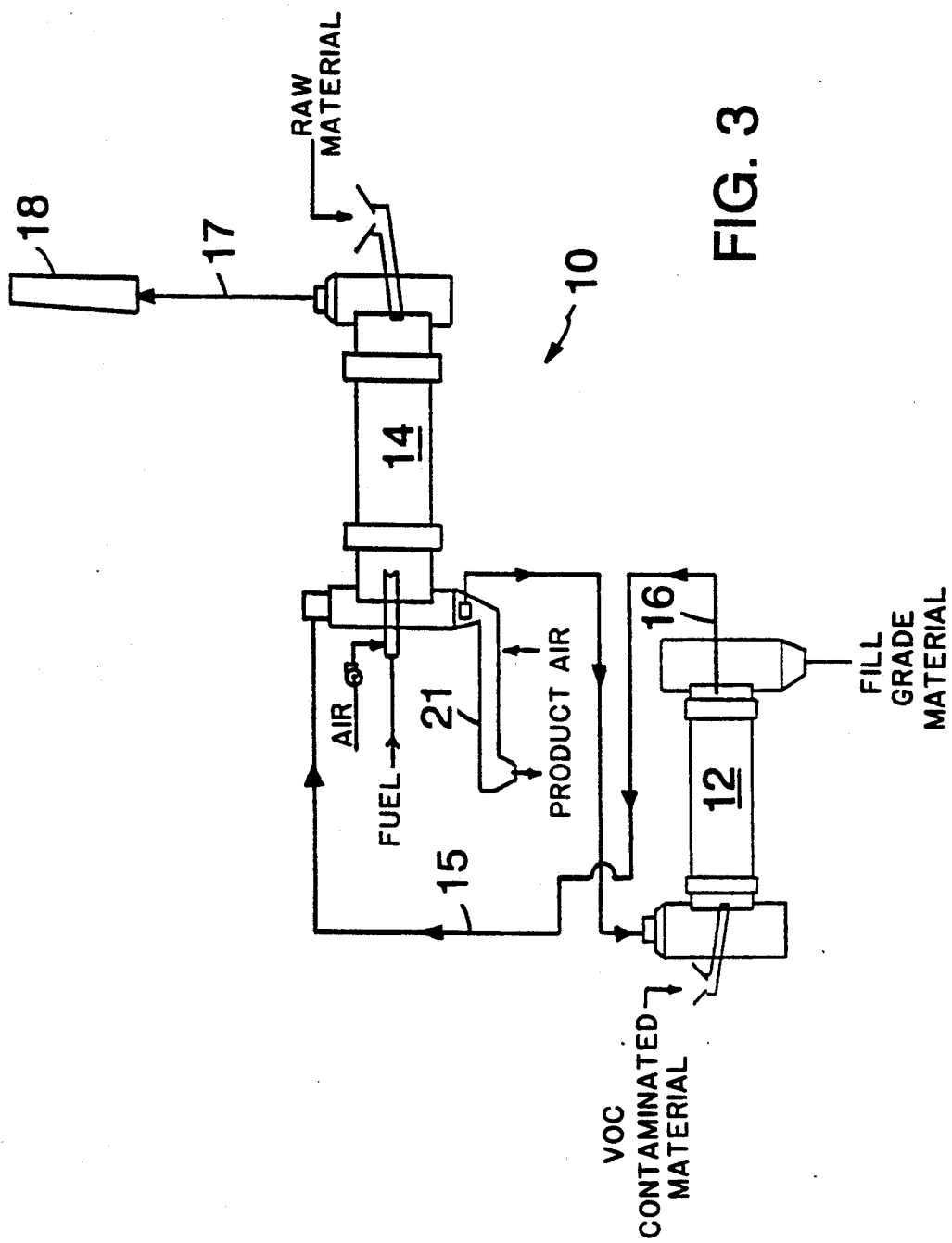
FIG. 3 is an alternate embodiment of the present invention.

Other embodiments are within the following claims. For example, the particulate solid material to be processed in the kiln can be chosen from shale, clay, slate, limestone, calcite, phosphate rock, or aluminum oxide. Further, the VOC-contaminated material can be any organic material that volatilizes in the 300°-500° F. range and is broken down into non-toxic substances above about 1800° F. The heat source for the dryer can be separate from the kiln. The dryer can be operated with heat flow in the same direction as (rather than counter to) the flow of VOC-contaminated material as shown in FIG. 3. The dryer can have an auxiliary heat source, in addition to the heated air from the kiln product cooler.

We claim:

1. Apparatus for stripping solid material containing a volatile organic compound (VOC) comprising:
   a) a dryer capable of heating said VOC-containing material to a first temperature which is hot enough to volatilize said VOC and is below the cracking temperature of said VOC, whereby said VOC in said dryer is volatilized to form VOC gases;
   b) a combustion apparatus comprising a heat source and a heating chamber for producing a product at high temperature, said heat source being capable of subjecting said VOC gases to a second temperature hot enough to break down said VOC gases to non-toxic products, said heating chamber comprising material suitable to withstand said second temperature;
   c) a conduit for transferring said VOC gases from said dryer to said combustion apparatus, said dryer and said conduit substantially preventing release of said VOC gases to the surrounding environment; and
   d) a second conduit for conducting heated air from said combustion apparatus to said dryer, whereby said dryer uses said heated air at least in part to heat said VOC-containing material in said dryer.

2. A method for stripping volatile organic compound (VOC)-containing material, comprising the steps of:
   heating said VOC-containing material in a dryer to a first temperature hot enough to volatilize said VOC and below the cracking temperature of said VOC, to produce VOC gases,
   transferring said VOC gases through a conduit from said dryer to a combustion apparatus for combusting said VOC gases in the presence of excess oxygen, said combustion apparatus comprising a heat source and a heating chamber, and subjecting said VOC gases to a second temperature, hot enough to break down said VOC gases into non-toxic gases;
   feeding a high-temperature processable material to said heating chamber, wherein said heat source heats said material to said second temperature, thereby converting said material to a desired product; and
   conducting heated air from said combustion apparatus to said dryer, whereby said dryer uses said heated air at least in part as its heat source.

3. The apparatus of claim 1 wherein said combustion apparatus further comprises:
   a) means for feeding a high-temperature processable material to said heating chamber, said heat source being capable of heating said material in said heating chamber to said second temperature thereby converting said material to a desired product; and
   b) means to recover said desired product.

4. The apparatus of claim 3 wherein said combustion chamber further comprises a product cooler and a second conduit for conducting heated air from said product cooler to said dryer, whereby said dryer uses said heated air at least in part to heat said VOC-contaminated material in said dryer.

5. The apparatus of claim 1 or claim 4 in which said dryer further comprises an auxiliary heat source in addition to said heated air provided through said conduit.

6. The apparatus of claim 1 or claim 4 wherein said second conduit introduces said heated air to said dryer in a flow counter to the flow of said VOC-containing material in said dryer.

7. The apparatus of claim 1 or claim 4 wherein said second conduit introduces said heated air to said dryer in a flow that is in the same direction as the flow of said VOC-containing material.

8. The apparatus of claim 1 comprising means to maintain said dryer and said conduit at a pressure below the surrounding ambient pressure, whereby VOC gas flow out of said dryer and conduit to the surrounding environment is substantially prevented.

9. The apparatus of claim 1 wherein said dryer is adapted to receive VOC-containing material comprising soil and a VOC selected from the group consisting of petroleum- or natural gas-based hydrocarbon, halogenated hydrocarbon, nitrated, and sulfonated hydrocarbon.

10. The apparatus of claim 3 wherein said combustion apparatus is adapted to process a solid particulate material.

11. The apparatus of claim 10 wherein said combustion apparatus is adapted to process shale, clay, slate, limestone, calcite, phosphate rock, or aluminum oxide.

12. The apparatus of claim 1 wherein said dryer is adapted to maintain said solid VOC-containing material at a temperature between 300° F. and 500° F. and said heat source of said combustion apparatus is adapted to subject said VOC gases to a temperature of at least 1800° F.

13. The apparatus of claim 12 wherein said dryer is adapted to maintain said solid VOC-containing material at a temperature between 350° F. and 450° F., said heat source of said combustion apparatus is adapted to subject said VOC gases to a temperature of at least 2,000° F.

14. The apparatus of claim 1 wherein said dryer is a rotary dryer, and said combustion apparatus is a rotary kiln.

15. The apparatus of claim 1 wherein said heat source is adapted to subject said VOC gases to said second temperature for at least about two seconds in the presence of excess air.

16. The apparatus of claim 1 wherein said dryer is adapted to receive VOC-contaminated material.

17. The method of claim 2 wherein said combustion apparatus is a kiln, and said method further comprises heating a high-temperature processable material in said combustion apparatus to form a desired product simultaneously with combusting said VOC gases.

18. The method of claim 17 wherein said kiln comprises a product cooler, and the method further comprises conducted heated air from said product cooler to said dryer to heat said dryer, whereby said dryer uses said heated air at lest in part as said dryer heat source.

19. The method of claim 2 or claim 18 further comprising heating said dryer with an auxiliary heat source in addition to said heated air.

20. The method of claim 2 or claim 18 wherein said heated air is introduced into said dryer in a flow counter to the flow of said VOC-contaminated material in said dryer.

21. The method of claim 2 or claim 18 wherein said heated air is introduced into said dryer in a flow that is in the same direction as the flow of said VOC-containing material.

22. The method of claim 2 comprising maintaining said dryer and said conduit at a pressure below the surrounding ambient pressure, whereby VOC gas flowing out of said dryer and conduit to the surrounding environment is substantially prevented.

23. The method of claim 2 wherein said VOC-containing material is soil comprising petroleum or natural gas-based hydrocarbon, halogenated hydrocarbon, nitrated, or sulfonated hydrocarbon.

24. The method of claim 2 wherein said VOC-containing material is solid material contaminated with at least one VOC.

25. The method of claim 17 wherein said high-temperature processable material is solid particulate material.

26. The method of claim 25 wherein said material is chosen from the group consisting of shale, clay, slate, limestone, calcite, phosphate rock, and aluminum oxide, and said second temperature is at least 1800° F.

27. The method of claim 2 wherein said first temperature is between 300° F. and 500° F. and said second temperature is at least 1800° F.

28. The method of claim 27 wherein said first temperature is between 350° F. and 450° F., and said second temperature is at least about 2,000° F.

29. The method of claim 2 wherein said dryer is a rotary dryer, and said combustion apparatus is a rotary kiln.

30. The method of claim 2 wherein said VOC gases are subjected to said second temperature for at least about two seconds in the presence of excess air.

* * * * *